(12) United States Patent
Streibig (10) Patent No.: US 7,172,286 B2
(45) Date of Patent: *Feb. 6, 2007

(54) COLORED CONTACT LENS

(75) Inventor: Daniel G. Streibig, Ballwin, MO (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/133,976

(22) Filed: May 20, 2005

(65) Prior Publication Data

US 2005/0213028 A1    Sep. 29, 2005

Related U.S. Application Data (60) Continuation of application No. 10/725,693, filed on Dec. 2, 2003, now Pat. No. 6,896,369, which is a division of application No. 09/934,327, filed on Aug. 21, 2001, now Pat. No. 6,655,804, which is a continuation-in-part of application No. 09/897,011, filed on Jun. 29, 2001, now Pat. No. 6,733,126.

(51) Int. Cl.
G02C 7/04    (2006.01)

(52) U.S. Cl. .................................... 351/162
(58) Field of Classification Search ................ 351/162
See application file for complete search history.

(56) References Cited

U.S. PATENT DOCUMENTS

| | | | |
|---|---|---|---|
| D211,757 S | 7/1968 | Urbach | D16/101 |
| 3,476,499 A | 11/1969 | Wichterle | 8/507 |
| 3,536,386 A | 10/1970 | Spivack | 351/160 |
| 3,679,504 A | 7/1972 | Wichterle | 156/62 |
| 3,712,718 A | 1/1973 | LeGrand et al. | 351/160 |
| 4,252,421 A | 2/1981 | Foley, Jr. | 351/162 |
| 4,460,523 A | 7/1984 | Neefe | 264/1.9 |
| 4,472,327 A | 9/1984 | Neefe | 264/1.9 |
| 4,525,044 A | 6/1985 | Bauman | 351/160 |
| 4,582,402 A * | 4/1986 | Knapp | 351/162 |
| 4,668,240 A | 5/1987 | Loshaek | 8/507 |
| 4,681,412 A | 7/1987 | Lemelson | 351/162 |
| 4,701,038 A | 10/1987 | Neefe | 351/162 |
| 4,704,017 A | 11/1987 | Knapp | 351/177 |
| 4,709,657 A | 12/1987 | Gothard | 119/253 |
| 4,719,657 A | 1/1988 | Bawa | 8/453 |
| 4,720,188 A | 1/1988 | Knapp | 351/177 |

(Continued)

FOREIGN PATENT DOCUMENTS

CA    710 230    5/1965

(Continued)

Primary Examiner—Jordan M. Schwartz (57) ABSTRACT

A colored contact lens comprising a generally uncolored pupil region, a generally annular-shaped iris region and a multicolored pattern on the iris region. The multicolored pattern is sufficiently colored to change the apparent color of an iris of a person wearing the contact lens and comprises a plurality of color elements. The multicolored pattern further comprising a collarette region that comprises at least some of the color elements and a collarette band at least substantially surrounding the pupil region that has generally jagged inner and outer peripheries. The collarette band including at least a first portion spaced less than 4 mm from the center of the pupil region and a second portion spaced at least 6.5 mm from the center of the pupil region.

21 Claims, 9 Drawing Sheets

U.S. PATENT DOCUMENTS

| | | | |
|---|---|---|---|
| 4,744,647 A | 5/1988 | Meshel et al. | 351/177 |
| 4,745,857 A | 5/1988 | Putnam et al. | 101/44 |
| 4,840,477 A | 6/1989 | Neefe | 351/162 |
| 4,850,695 A | 7/1989 | Mikuriya et al. | 356/237 |
| 4,867,552 A | 9/1989 | Neefe | 351/162 |
| 4,872,405 A | 10/1989 | Sterman | 101/44 |
| 4,889,421 A | 12/1989 | Cohen | 351/162 |
| 4,946,269 A | 8/1990 | Magdassi | 351/162 |
| 4,981,487 A | 1/1991 | Da Costa | 8/507 |
| 5,120,121 A | 6/1992 | Rawlings et al. | 351/162 |
| 5,126,531 A | 6/1992 | Majima et al. | 219/121.68 |
| 5,158,718 A | 10/1992 | Thakrar et al. | 264/1.36 |
| 5,160,463 A | 11/1992 | Evans et al. | 264/1.7 |
| 5,205,212 A | 4/1993 | Wolfe | 101/170 |
| 5,244,470 A | 9/1993 | Onda et al. | 8/507 |
| 5,272,010 A | 12/1993 | Quinn | 428/411.1 |
| 5,302,978 A | 4/1994 | Evans et al. | 351/162 |
| 5,307,704 A | 5/1994 | Muller et al. | 74/411 |
| 5,414,477 A | 5/1995 | Jahnke | 351/162 |
| 5,446,565 A | 8/1995 | Komma et al. | 369/19 |
| 5,467,149 A | 11/1995 | Morrison et al. | 351/162 |
| 5,511,050 A | 4/1996 | Matsumoto et al. | 369/44.23 |
| 5,637,265 A | 6/1997 | Misciagno et al. | 419/6 |
| 5,665,957 A | 9/1997 | Lee et al. | 369/53.23 |
| 5,704,017 A | 12/1997 | Heckerman et al. | 706/12 |
| 5,724,325 A | 3/1998 | Jeong | 369/44.27 |
| 5,731,898 A | 3/1998 | Orzi et al. | 359/587 |
| 5,733,333 A | 3/1998 | Sankey | 623/4.1 |
| 5,754,507 A | 5/1998 | Nishikata | 369/44.29 |
| 5,757,458 A | 5/1998 | Miller et al. | 351/162 |
| 5,757,745 A | 5/1998 | Takeya | 369/58 |
| 5,786,883 A | 7/1998 | Miller et al. | 351/162 |
| 5,790,493 A | 8/1998 | Takeya et al. | 369/58 |
| 5,819,661 A | 10/1998 | Lewis et al. | 101/467 |
| 5,887,247 A | 3/1999 | Baltus et al. | 455/277.2 |
| 5,936,704 A | 8/1999 | Gabrielian et al. | 351/160 R |
| 5,936,705 A | 8/1999 | Ocampo et al. | 351/162 |
| 6,030,078 A | 2/2000 | Ocampo | 351/162 |
| 6,070,527 A | 6/2000 | Yamane et al. | 101/150 |
| 6,123,021 A | 9/2000 | Cameron | 101/41 |
| 6,132,043 A | 10/2000 | Atkins et al. | 351/162 |
| 6,135,654 A | 10/2000 | Jennel | 400/61 |
| 6,139,577 A | 10/2000 | Schleipman et al. | 623/6.64 |
| 6,143,026 A | 11/2000 | Meakem | 128/898 |
| 6,196,683 B1 | 3/2001 | Quinn et al. | 351/162 |
| 6,197,409 B1 | 3/2001 | Bodager et al. | 428/212 |
| 6,240,054 B1 | 5/2001 | Takeya et al. | 369/53.37 |
| 6,276,266 B1 | 8/2001 | Dietz et al. | 101/41 |
| 6,315,410 B1 | 11/2001 | Doshi | 351/162 |
| 6,523,953 B2 | 2/2003 | Jahnke | 351/162 |
| 6,733,126 B2 * | 5/2004 | Streibig | 351/162 |
| 6,767,097 B2 | 7/2004 | Streibig | 351/162 |
| 2001/0050753 A1 | 12/2001 | Tucker | 351/177 |
| 2002/0039172 A1 * | 4/2002 | Ocampo et al. | 351/162 |
| 2002/0080327 A1 | 6/2002 | Clark et al. | 351/162 |
| 2002/0182316 A1 | 12/2002 | Gilliard et al. | 427/162 |
| 2003/0025873 A1 * | 2/2003 | Ocampo | 351/162 |
| 2003/0156249 A1 * | 8/2003 | Jahnke | 351/162 |
| 2003/0184710 A1 * | 10/2003 | Tucker | 351/162 |

FOREIGN PATENT DOCUMENTS

| | | |
|---|---|---|
| EP | 0 369 942 | 5/1990 |
| EP | 0 390 443 | 10/1990 |
| EP | 0 484 044 | 5/1992 |
| JP | HEI 8 112 566 | 5/1996 |
| WO | WO 83/03480 | 10/1983 |
| WO | WO 91/06886 | 5/1991 |
| WO | WO 01/40846 | 6/2001 |

* cited by examiner

COLORED CONTACT LENS

This application is a continuation of U.S. patent application Ser. No. 10/725,693, filed Dec. 2, 2003 now U.S. Pat. No. 6,896,369, and entitled Colored Contact Lens, which is a divisional of Ser. No. 09/934,327 filed Aug. 21, 2001 now U.S. Pat. No. 6,655,804, and entitled Colored Contact Lens and Method of Making Same, which is a continuation-in-part of Ser. No. 09/897,011, filed Jun. 29, 2001, now U.S. Pat. No. 6,733,126, entitled Colored Contact Lens And Method Of Making Same, each of which is incorporated herein by reference.

BACKGROUND OF THE INVENTION

This invention relates to colored contact lenses and methods of making colored contact lenses.

Colored contact lenses are often used for cosmetic purposes to change the apparent color of a wearer's irises. For example, a person with brown or blue eyes desiring to have green eyes may wear green colored contact lenses to change the apparent color of a wearer's iris to green.

Conventional colored contact lenses (also called cosmetic contact lenses) typically depend on the lens wearer's iris structure to impart an apparent color change to the wearer's iris. Such contact lenses have a colored iris pattern thereon. The pattern comprises discreet opaque color elements with generally non-colored areas (e.g., clear or slightly colored translucent areas) within the interstices of the pattern's color elements. Knapp U.S. Pat. No. 4,582,402 discloses that a contact lens having an adequate amount of discreet opaque pigmented elements in the pattern combined with non-colored areas which permit the wearer's iris structure to show through provides a sufficiently realistic and attractive illusion of iris color change to convince a casual observer that the iris color is natural, at least when the casual observer is at least five feet away.

A disadvantage associated with such prior art cosmetic contact lenses is that the apparent eye color of some people wearing the lenses does not look natural even when the casual observer is more than five feet away. In particular, the apparent color does not look natural when the actual color of the wearer's iris is in sharp contrast with the opaque color of the contact lens pattern. Thus, for many people, such conventional cosmetic contact lenses are not a viable way for changing apparent iris color.

Another disadvantage associated with such prior art cosmetic contact lenses is that even when worn by wearers for whom the contact lenses are intended, the apparent iris color looks natural only when viewed from a distance of at least five feet by an ordinary viewer (i.e., a person having normal 20/20 vision). The ordinary viewer viewing the wearer's eyes from a closer distance might determine that the pattern is not a naturally occurring pattern. In other words, the ordinary viewer might correctly determine that the wearer is wearing colored contact lenses.

Jahnke U.S. Pat. No. 5,414,477 and O'Campo U.S. Pat. No. 5,963,705, like the Knapp patent, disclose contact lenses having opaque intermittent elements and non-colored regions through which significant portions of the wearer's iris structure are visible. These patents disclose making the intermittent elements of a single contact lens having up to three different color elements. The additional lens colors help to blend the color contrasting that occurs between the wearer's iris and the colored elements placed on the contact lens. However, because the typical human iris has more than 1000 distinct colors, the prior art cosmetic contact lenses do not provide anything close to a universally appealing opaque contact lens.

Another disadvantage of conventional cosmetic contact lenses is that such lenses merely attempt to change the apparent color of wearer's irises. The lens patterns of such cosmetic contact lenses do not emulate the detail and attractive structure of a natural human iris.

SUMMARY OF THE INVENTION

Among the several objects and advantages of the present invention may be noted the provision of an improved colored contact lens; the provision of such a colored contact lens capable of effectuating a natural appearing color change to irises of a larger group of people than prior art contact lenses; the provision of a contact lens capable of effectuating a natural looking change in the appearance of the wearer's iris regardless of the actual color of the wearer's iris; the provision of such a colored contact lens having an iris section colored in a manner to effectuate a change in the appearance of the wearer's iris but which makes the presence of the contact lens substantially imperceptible to an observer observing the wearer's eyes from a close distance; the provision of a colored contact lens which more closely resembles some of the intricate structural components a human iris; and the provision of a method of coloring a lens substrate to form a colored lens having a pattern of greater intricacy.

Generally, a method of the present invention is for coloring contact lenses. The method comprises storing a generally annular-shaped initial iris image in a computer. The initial iris image comprises a plurality of color elements. The method further comprises applying a filtering process to the initial iris image in a manner to replace at least portions of at least some of the color elements with generally uncolored regions to form a filtered iris image, and using a printer apparatus, in communication with the computer, in a manner to print the filtered iris image on a contact lens substrate.

Another aspect of the present invention is a colored contact lens comprising, a generally uncolored pupil region, the pupil region having a center, a generally annular-shaped iris region surrounding the pupil region and adapted to cover at least 80% of a wearer's iris when the wearer is wearing the contact lens, a multicolored pattern on the iris region, the multicolored pattern being sufficiently colored to change the apparent color of an iris of a person wearing the contact lens. The multicolored pattern comprises a plurality of color elements, and a collarette region that comprises at least some of the color elements. Further, the collorette region comprises a collarette band at least substantially surrounding the pupil region, wherein the collarette band has a generally jagged outer periphery, a generally jagged inner periphery, and includes at least a first portion spaced less than 4 mm from the center of the pupil region and a second portion spaced at least 6.5 mm from the center of the pupil region.

Also, the present invention is directed to a colored contact lens comprising a generally uncolored pupil region, the pupil region having a center; a generally annular-shaped iris region surrounding the pupil region and adapted to cover at least 80% of a wearer's iris when the wearer is wearing the contact lens; a multicolored pattern on the iris region, the multicolored pattern being sufficiently colored to change the apparent color of an iris of a person wearing the contact lens, and comprising a plurality of color elements, which are sufficiently colored to mask regions of the wearer's iris that underlie the color elements when the wearer is wearing the contact lens; and a generally uncolored region defined by one or more of the color elements. Additionally, the multicolored pattern on the iris region comprises a collarette region that is comprised of at least some of the color elements. The collarette region also comprises a collarette band at least substantially surrounding the pupil region, and has a generally jagged outer periphery and a generally jagged inner periphery. Further, the collarette band includes at least a first portion spaced less than 4 mm from the center of the pupil region and a second portion spaced at least 6.5 mm from the center of the pupil region. The multicolored pattern also comprises a plurality of crypts of Fuchs elements each having the appearance of a crypts of Fuchs. Each of the crypts of Fuchs elements is comprised of at least some of the color elements, and contrasts in color with the color elements adjacent the crypts of Fuchs elements. Further, the each of the crypts of Fuchs elements have a generally oblong shape. The generally uncolored region comprises a generally uncolored segment, which has a length of at least 30 microns and a width of no greater than 60 microns. Both the generally uncolored region and the generally uncolored segment are sufficiently devoid of colorant so as not to mask regions of the wearer's iris that underlie the generally uncolored region and the generally uncolored segment when the wearer is wearing the contact lens.

Additionally, the present invention is directed to a colored contact lens comprising a generally uncolored pupil region, the pupil region having a center; a generally annular-shaped iris region surrounding the pupil region and adapted to cover at least 80% of a wearer's iris when the wearer is wearing the contact lens; a multicolored pattern on the iris region, the multicolored pattern being sufficiently colored to change the apparent color of an iris of a person wearing the contact lens, and comprising a plurality of color elements; and more than 1000 discrete generally uncolored regions defined by the color elements. The multicolored pattern further comprises a collarette region that is comprised of at least some of the color elements. Additionally, the collarette region comprises a collarette band at least substantially surrounding the pupil region, and the collarette band has a generally jagged outer periphery and a generally jagged inner periphery. The collarette band also includes at least a first portion spaced less than 4 mm from the center of the pupil region and a second portion spaced at least 6.5 mm from the center of the pupil region. Further, at least 1000 of the discrete generally uncolored regions are sufficiently small such that their presence cannot be detected, and sufficiently large such that they contribute to the overall appearance of the contact lens when an ordinary viewer with 20/20 vision is viewing the contact lens from a distance of sixteen inches while a wearer is wearing the contact lens.

Another aspect of the present invention is a colored contact lens comprising a generally uncolored pupil region and a generally annular-shaped iris region surrounding the pupil region and adapted to cover at least 80% of a wearer's iris when the wearer is wearing the contact lens. A multicolored pattern is on the iris region. The multicolored pattern is sufficiently colored to change the apparent color of an iris of a person wearing the contact lens. The multicolored pattern comprises a plurality of color elements. A plurality of discrete generally uncolored regions are defined by at least some of the color elements. The generally uncolored regions are sufficiently small such that an ordinary viewer viewing the contact lens from a distance of sixteen inches cannot detect the presence of the generally uncolored regions when the wearer is wearing the contact lens. The generally uncolored regions are sufficiently large such that the generally uncolored regions contribute to the overall appearance of the contact lens as viewed by the ordinary viewer from a distance of sixteen inches, the ordinary viewer having 20/20 vision.

Another aspect of the present invention is a colored contact lens comprising a generally uncolored pupil region and a generally annular-shaped iris region surrounding the pupil region and adapted to cover at least 80% of a wearer's iris when the wearer is wearing the contact lens. A multicolored pattern is on the iris region. The multicolored pattern is sufficiently colored to change the apparent color of an iris of a person wearing the contact lens. The multicolored pattern comprises a plurality of discrete color regions. Generally uncolored interstices are between at least some of the discrete color regions. The interstices are sufficiently small such that an ordinary viewer viewing the contact lens from a distance of sixteen inches cannot detect the presence of the interstices when the wearer is wearing the contact lens. The interstices are sufficiently large such that the interstices contribute to the overall appearance of the contact lens as viewed by the ordinary viewer from a distance of sixteen inches, the ordinary viewer having 20/20 vision.

Another aspect of the present invention is a colored contact lens comprising a generally uncolored pupil region and a generally annular-shaped iris region surrounding the pupil region and adapted to cover at least 80% of a wearer's iris when the wearer is wearing the contact lens. A multicolored pattern is on the iris region. The multicolored pattern is sufficiently colored to change the apparent color of an iris of a person wearing the contact lens. The multicolored pattern comprises a plurality of color elements. The multicolored pattern comprises an annular-shaped outer region and an annular-shaped inner region. The outer region generally circumscribes the inner region. The outer region has a first plurality of generally uncolored regions defined by some of the colored elements. The inner region has a second plurality of generally uncolored regions defined by some of the colored elements. The first plurality of the generally uncolored regions combine to have a first aggregate uncolored area. The second plurality of the generally uncolored region combine to have a second aggregate uncolored area. At least 60% of the first aggregate uncolored area is comprised of generally uncolored regions each having an area not greater than approximately 900 square microns. At least 50% of the second aggregate uncolored area is comprised of generally uncolored regions each having an area greater than approximately 900 square microns.

Another aspect of the present invention is a colored contact lens comprising a generally uncolored pupil region and a generally annular-shaped iris region surrounding the pupil region and adapted to cover at least 80% of a wearer's iris when the wearer is wearing the contact lens. A multicolored pattern is on the iris region. The multicolored pattern is sufficiently colored to change the apparent color of an iris of a person wearing the contact lens. The multicolored pattern comprises a plurality of color elements. The multicolored pattern comprises an annular-shaped outer region and an annular shaped inner region. The outer region generally circumscribes the inner region. The outer region has a first plurality of generally uncolored regions defined by some of the colored elements. The inner region has a second plurality of generally uncolored regions defined by some of the colored elements. Each of at least 60% of the generally uncolored regions of the first plurality of generally uncolored regions has an area not greater than approximately 900 square microns. Each of at least 50% of the generally uncolored regions of the second plurality of generally uncolored regions has an area greater than approximately 900 square microns.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
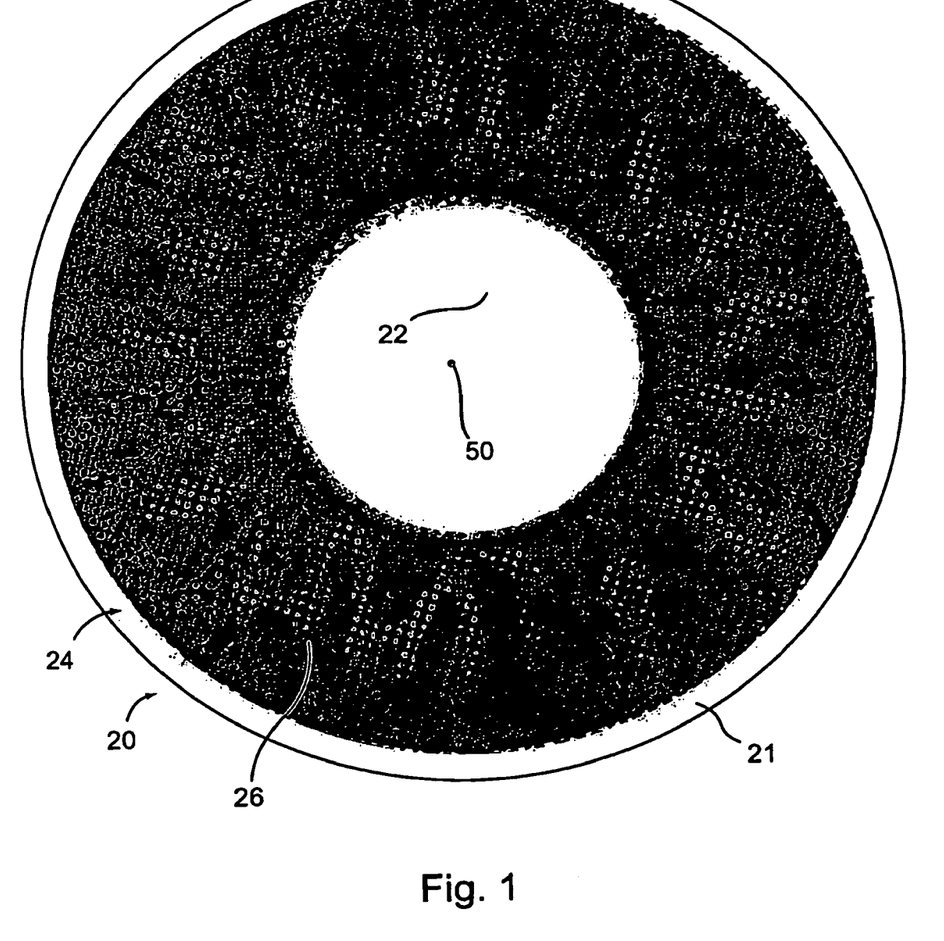
FIG. 1 is an enlarged top plan view of a cosmetic contact lens of the present invention, the contact lens having a contact lens substrate and a multicolored pattern on the substrate.
Figure 2:
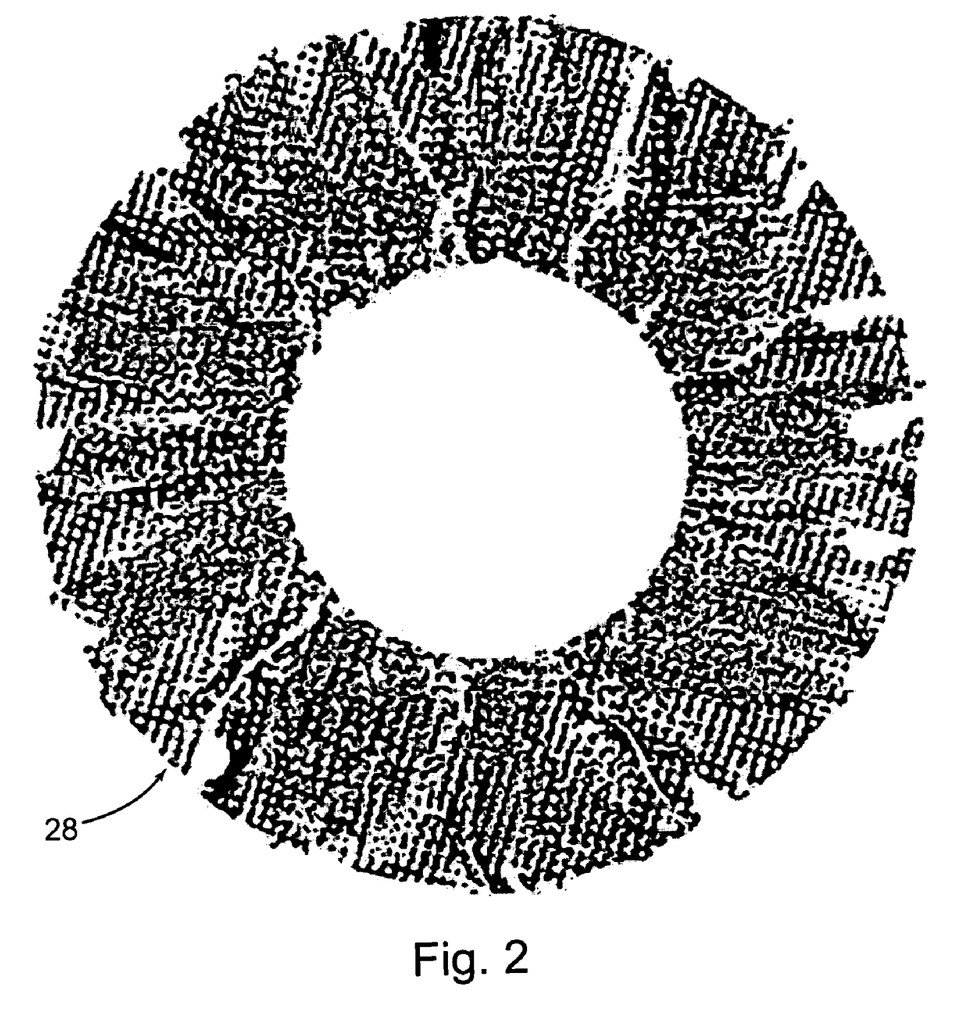
FIG. 2 is a top plan view showing an epithelial region of the multicolored pattern of FIG. 1.
Figure 3:
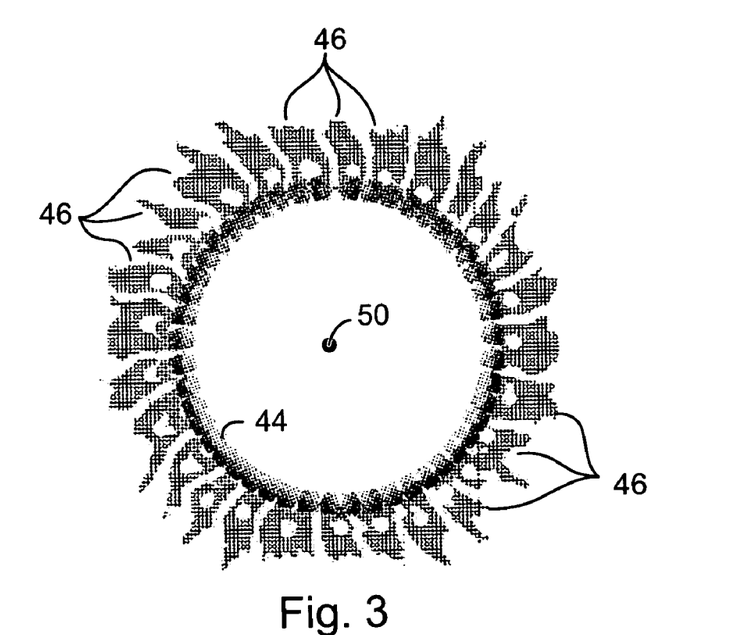
FIG. 3 is a top plan view showing a pupillary margin region of the multicolored pattern of FIG. 1.

Referring now to the drawings and first more particularly to FIG. 1, a contact lens of the present invention is indicated in its entirety by the reference numeral 20. The contact lens 20 comprises a contact lens substrate 21 having a generally uncolored pupil region, generally indicated at 22, an annular-shaped iris region, generally indicated at 24. The lens substrate 21 is preferably a hydrophilic contact lens. The annular-shaped iris region 24 surrounds the pupil region 22. The contact lens 20 further comprises a multicolored pattern, generally indicated at 26, on the lens substrate 21. The multicolored pattern 26 is on the iris region 24. As used herein, the phrase "generally uncolored" when referring to a region of the contact lens means the region is either clear, transparent, or only slightly colored and translucent and non-opaque. The pupil region 22 must be sufficiently devoid of colorant to enable the wearer to see through the contact lens.

The multicolored pattern 26 preferably has a visual appearance of many of the structural components of a human iris. However, because the multicolored pattern 26 is represented in black and white in FIG. 1, the structural components are not as apparent as if viewed in color. Thus, to increase the reader's understanding of the preferred embodiment of the multicolored pattern 26, the pattern has been broken down into different multiple colored "layers" shown in FIGS. 2–6. Although the different layers may be serially printed on the contact lens substrate, it is preferable that all layers simultaneously be printed on the contact lens substrate via an inkjet printing process. In other words, the multicolored pattern 26 is broken down herein into constituent parts to facilitate an understanding of the components of the pattern and not because such a breakdown is necessary.

Figure 6:
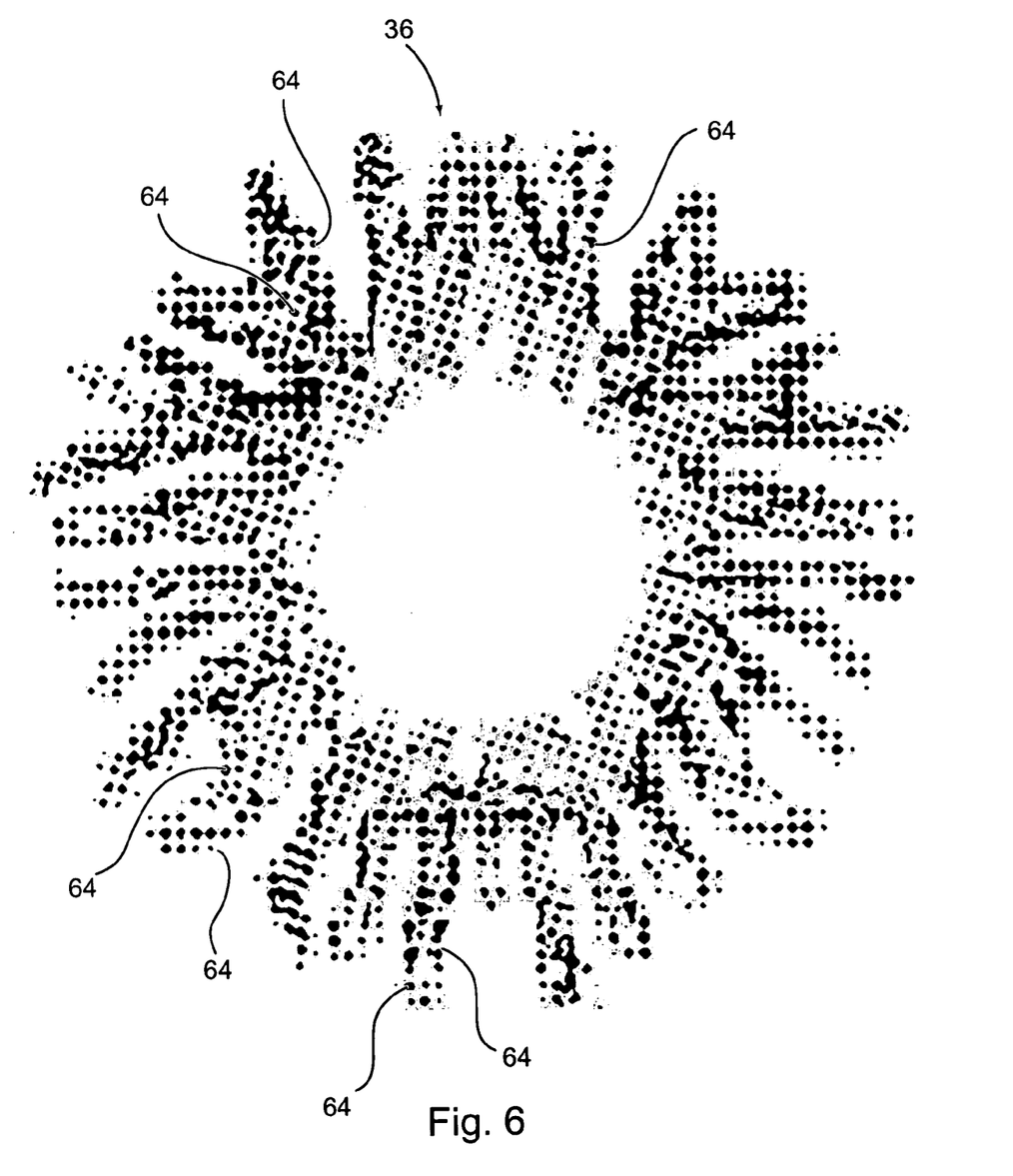
FIG. 6 is a top plan view showing of the multicolored pattern of a dilator pupillae region FIG. 1.

The multicolored pattern 26 preferably comprises an epithelial region generally indicated at 28 (FIG. 2), a pupillary margin region generally indicated at 30 (FIG. 3), a collarette region generally indicated at 32 (FIG. 4), crypts of Fuchs elements 34 (FIG. 5), and a dilator pupillae region generally indicated at 36 (FIG. 6). Each of the above regions are preferably comprised of a plurality of colored elements or a combination of colored and non-colored elements. A colored element is preferably of a colorant sufficiently opaque to mask the underlying region of the wearer's iris. An uncolored element is preferably clear, but may be slightly colored by a colorant which is sufficiently non-opaque so as not to mask the underlying region of the wearer's iris. Also preferably, the color elements which make up the regions do not overlap. In other words, the multicolored pattern preferably has no portion which is more than one color layer thick.

The epithelial region 28 (FIG. 2) preferably simulates the epithelium of an exemplary human iris. The epithelium of a human iris provides the iris' basic color. It comprises a collective grouping of pigmented cells referred to as melanocytes. Melanocytes are generally uniform in shape. The epithelial region 28 preferably includes a plurality of shades of the same basic color. For example, a blue cosmetic contact lens of the present invention preferably has an epithelial region comprising at least a plurality of different shades of blue whereas a green cosmetic contact lens of the present invention preferably has an epithelial region comprising at least a plurality of different shades of green.

The pupillary margin region 30 (FIG. 3) preferably simulates the pupillary band and inner sphincter pupillary constrictor muscles of an exemplary human iris. The pupillary margin region preferably includes a generally annular-shaped band 44 and a plurality of radially extending projections (fingers) 46. The band 44 surrounds the pupil region. Preferably, at least 90% of the band is within a radius of 4 mm from the pupil region's center 50, and more preferably 100% of the band is within a radius of 4 mm from the pupil region's center. In other words, 100% of the band 44 is preferably contained within an imaginary circle having a diameter of 8 mm. The projections 46 represent the sphincter pupillary constrictor muscles of an exemplary human iris. Preferably, at least 90% of the aggregate of the projections 46 is within a radius of 5 mm from the center 50 of the pupil region 22, and more preferably 100% of the aggregate of the projections is within 5 mm from the pupil region's center 50. In other words, all portions of the projections are preferably contained within an imaginary circle having a diameter of 10 mm. It is to be understood that the dimensions referred to herein are of the multicolored pattern when the colored contact lens is in a hydrated condition, i.e., one in a condition for being worn by the wearer. The projections 46 are also preferably spaced from one another to define generally radially extending grooves between them. Preferably, the band 44 is of a predominately first color and the projections 46 are of a predominately second color lighter than the first color. More preferably, the colored elements of the band 44 are of generally dark, light-absorbing colors and the colored elements of the projections are of generally lighter, light-reflecting colors.

Figure 4:
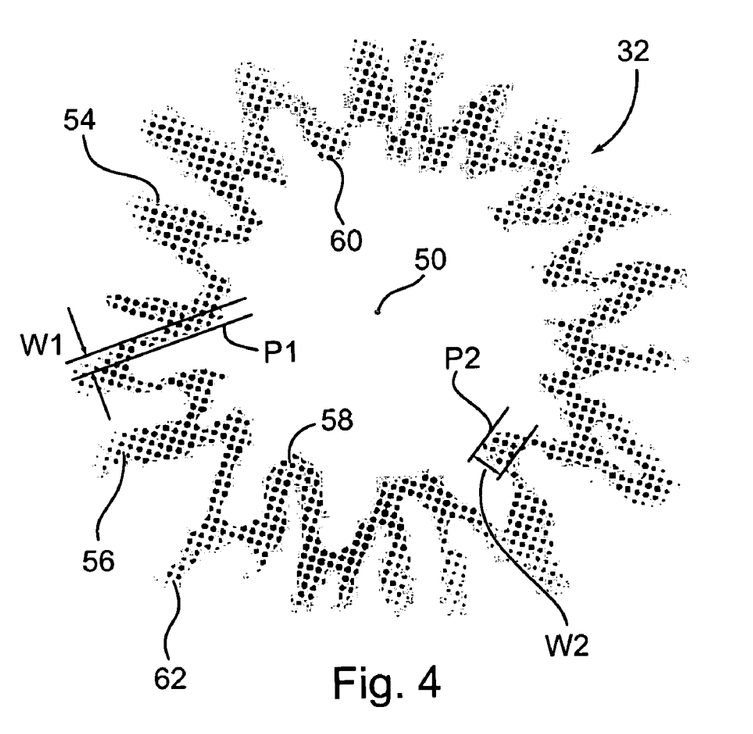
FIG. 4 is a top plan view showing a collarette region of the multicolored pattern of FIG. 1.
Figure 5:
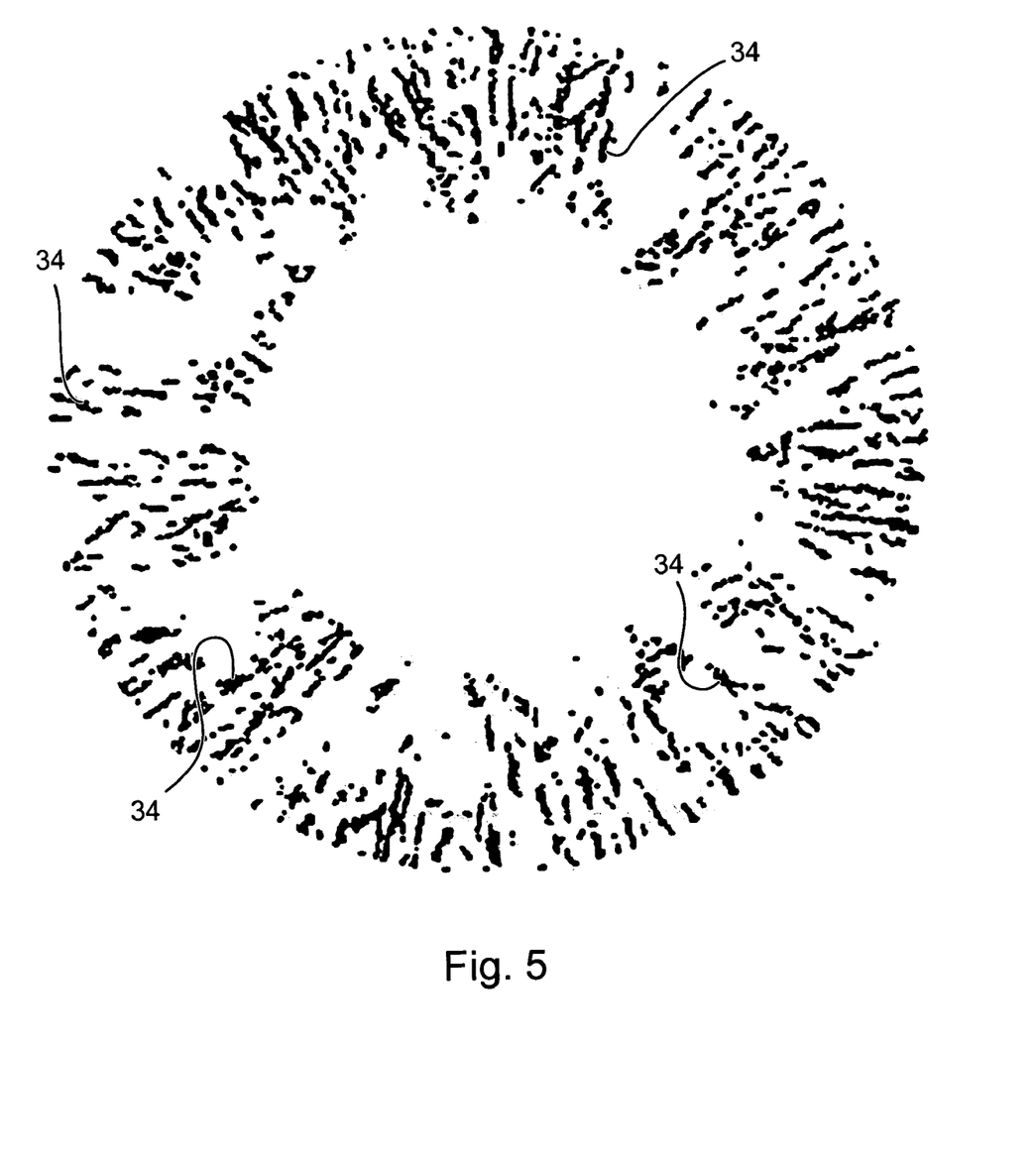
FIG. 5 is a top plan view showing crypts of Fuchs elements of the multicolored pattern of FIG. 1.

The collarette region 32 (FIG. 4) preferably simulates dilation folds of an exemplary human iris. The collarette region 32 is comprised of a plurality of the color elements of the multicolored pattern 26. The collarette region 32 comprises a collarette band 54 at least substantially surrounding the pupil region. The collarette band 54 has a generally jagged outer periphery 56 and a generally jagged inner periphery 58. The collarette band 54 is preferably asymmetrical and has a width. The width of the collarette band 54 at any point along the inner periphery 58 is the shortest distance from such point to the outer periphery. For example, as shown in FIG. 4 the width of the collarette band 54 at point p1 of the inner periphery 58 is w1, and the width of the collarette band at point p2 of the inner periphery is w2. The width of the collarette band 54 preferably ranges from 0.5 mm to 2 mm wide. More preferably, the width of the band at any point of at least 50% of the inner periphery 58 is no greater than approximately 1 mm, and the width of the band at any point of at least 80% of the inner periphery is no greater than approximately 1.5 mm. The collarette band 54 has an inward-most (first) portion 60 preferably spaced less than 4 mm from the center 50 of the pupil region 22 and an outward-most (second) portion 62 spaced at least 6.5 mm from the center of the pupil region.

The crypts of Fuchs elements 34 (FIG. 5) simulates crypts of Fuchs of an exemplary human iris. The appearance of crypts of Fuchs of an exemplary human iris are characterized by small, relatively dark, light-absorbing discreet areas devoid of stroma related fibers. Such a crypts of Fuchs has somewhat of an appearance of a tiny crater which is generally oblong in shape. The crypts of Fuchs elements 34 are comprised of some of the color elements of the multicolored pattern 26 and contrast in color with the color elements adjacent the crypts of Fuchs elements. The crypts of Fuchs elements 34 are generally oblong in shape and preferably extend generally radially away from the pupil region 22. More preferably, the crypts of Fuchs elements preferably have an oval shape and a width of at least 45 micrometers.

The dilator pupillae region 36 (FIG. 6) preferably simulates a dilator pupillae of an exemplary human iris. The dilator pupillae region 36 comprises a plurality of radial streaks 64 simulating various connective tissues and fibers extending from the sclera to the sphincter pupillae. Preferably, the streaks 64 of the dilator pupillae region 36 comprise a series of streaks of generally alternating light reflecting and light absorbing colors.

Figure 7:
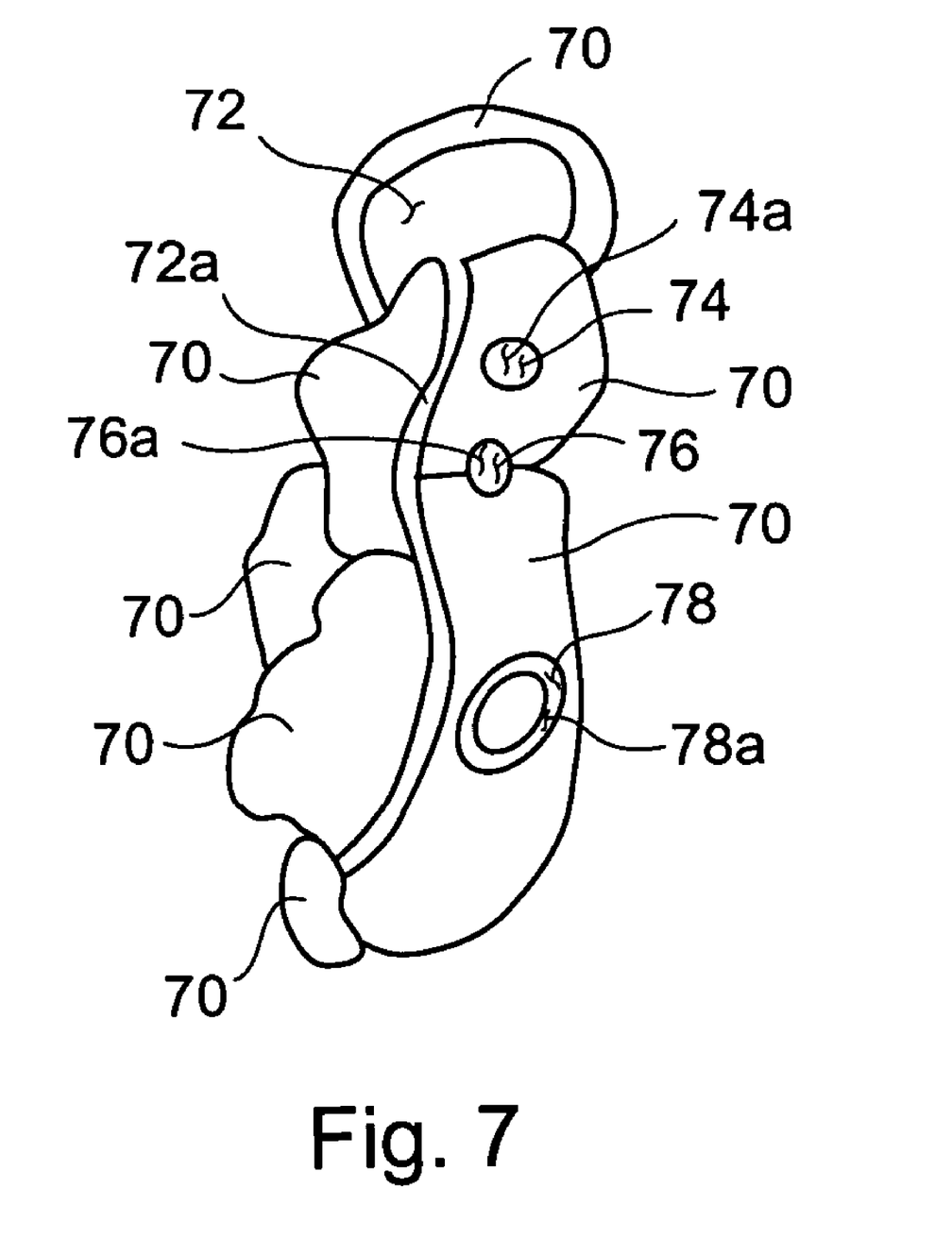
FIG. 7 is a highly enlarged, fragmented, top plan view of a portion of the multicolored pattern of FIG. 1 showing colored elements and uncolored regions of the pattern.

Reference is now made to FIG. 7 which shows a highly enlarged portion of the multicolored pattern 26. The multicolored pattern 26 comprises colored elements 70 and uncolored regions 72, 74, 76, 78 defined by one or more of the colored elements. Although it is to be understood that the pattern 26 may include several relatively large uncolored regions, the pattern preferably also includes many small uncolored regions. The uncolored regions 72, 74, 76, 78 are some examples of the types of small uncolored regions preferably included in the pattern 26. Each small uncolored region comprises at least one generally uncolored segment 72a, 74a, 76a, 78a having a length of at least 30 microns and a width of no greater than 60 microns. Each uncolored segment preferably has a width no greater than 40 microns and more preferably no greater than 30 microns. The uncolored segment may be relatively long and have a length of at least 100 microns (e.g., segment 72a). The uncolored region may be completely encircled by one color element (e.g., uncolored region 74). Also, the uncolored segment may comprise the entirety of the color region (e.g., uncolored region 74). The uncolored segment may be of any shape without departing from the scope of the present invention.

A person with typical vision unaided by any magnification device is unable to discern the presence of a small uncolored region (e.g., a circular-shaped region having a diameter of 30 microns or an elongate region having a width of 30 microns) regardless of how close the person is to the uncolored region. It is envisioned that the multicolored pattern 26 may comprise more than 1000 small uncolored segments or even more than 10,000 small uncolored segments. Additionally, the pattern 26 may comprise more than 1000 discrete generally uncolored regions or even more than 10,000 discrete generally uncolored regions. Preferably, more than at least 10,000 of the discrete generally uncolored regions are sufficiently small such that an ordinary viewer viewing the contact lens from a distance of sixteen inches cannot detect the presence of any of the at least 10,000 generally uncolored regions when the wearer is wearing the contact lens. As used herein, the "ordinary viewer" is a person having 20/20 vision viewing the contact lens without the aid of any magnification or other devices. Also preferably, the generally uncolored regions are sufficiently large such that the generally uncolored regions contribute to the overall appearance of the contact lens as viewed by the ordinary viewer from a distance of sixteen inches. Further, each of at least a majority of the generally uncolored regions preferably has an area of not greater than approximately 1200 square microns, and more preferably has an area of not greater than approximately 900 square microns.

The inclusion of small uncolored regions or uncolored segments in the multicolored pattern 26 enables the contact lens designer/manufacturer to provide a cosmetic contact lens in which the color elements of the pattern may blend with the composite color tones or basic iris shades of the wearer's irises. Because of the small size and large number of the segments, the blending will create a natural appearance even if a wide contrast exists between the basic color of the wearer's iris (e.g., dark brown) and the basic color of the multicolored pattern 26 (e.g., light blue). Moreover, it is to be understood that a human iris is as unique as a fingerprint. By providing a multicolored pattern with a large number of small uncolored regions, the appearance of each wearer's iris will still be unique, albeit very different than the appearance of the wearer's natural iris. Another benefit of the preferred multicolored pattern 26 is that the pattern addresses a need for a cosmetically appealing iris prosthesis for individuals needing full coverage of their irises to cover abnormalities on the iris caused by trauma scarring, genetic or congenital aberrations (such as heterochromia), legacy scarring from disease (e.g., herpes simplex ulcers, diabetic retinopathy), or remnants of past lesions resulting in permanent iris or cornea disfigurement. Because of the smallness of the uncolored regions, the structure of the abnormality will not show through.

Figure 8:
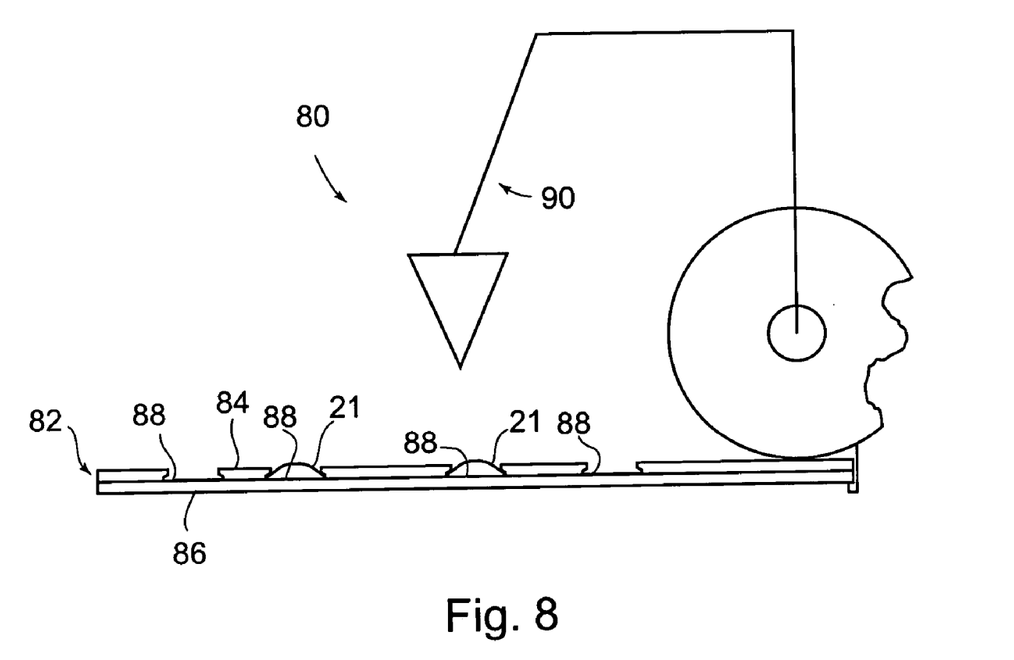
FIG. 8 is a schematic of an inkjet printer of the present invention.

The multicolored pattern 26 is preferably printed on the contact lens 20 via an inkjet printing process, such as that described in U.S. Pat. No. 6,767,097, filed Mar. 29, 2001, entitled Colored Contact Lens And Method Of Making Same, and incorporated herein by reference. A schematic of another embodiment of an inkjet printer, generally indicated at 80, is shown in FIG. 8. Preferably, the inkjet printer 80 directly deposits colorants onto the contact lens substrate to directly deposit the multicolored pattern on the substrate. The printer 80 may be any suitable inkjet printer, such as an Epson Stylus 1280 or a Hewlett Packard Desk Jet 970Cse. Preferably, the printer 80 is adapted to receive a lens-holding carrier 82. Preferably, the carrier comprises first and second magnetic sheets 84, 86 joined together by their polar properties. The first sheet 84 (also called the cut sheet) preferably includes a plurality of circular holes 88. Each circular hole 88 preferably has a diameter of approximately one millimeter less that the diameter of the non-hydrated lens substrate 21. The second sheet 86 preferably has no holes. In operation, one or more lens substrates 21 are placed between the sheets and aligned with the holes on the cut sheet so that the convex surface of the substrates face the holes 88 and so that the iris region 24 is exposed as a print surface. The inkjet printer 80 further comprises a print-head carrier mechanism 90. Preferably the print-head carrier mechanism 90 is spaced sufficiently from the lens print surface as the lens carrier 82 is fed through the printer to allow sufficient clearance for the print-head carrier to pass freely over the lens substrate 21 during transfer of the multicolored pattern 26 onto the substrate. Also preferably, the spacing of the print-head carrier and the shape of the image to be printed onto the lens substrate are selected to compensate for the convex dome-shaped surface of the lens substrate. Additionally or alternatively, the print-head carrier mechanism 90 and/or the carrier feed mechanism (not shown) may be configured to move in a manner to maintain a perpendicular orientation and equal spacing of the print-head carrier mechanism to the portion of the lens to which colorant is being deposited.

The inkjet printer 80 prints the multicolored pattern on the substrate based upon a digital graphic image stored on a conventional computer (not shown). The digital graphic image may be generated on any conventional computer preferably using commercially available software, such as Adobe Illustrator®, commercially available from Adobe Systems Incorporated of Palo Alto, Calif., or Paint Shop Pro™, commercially available from JASC Software, Inc. of Eden Prairie, Minn. The digital graphic image preferably has the characteristics of the multicolored pattern. The small uncolored regions are preferably formed in the digital graphic image by a filtering process via suitable software such as Adobe Illustrator or JASC Paint Shop Pro. Preferably, the density of the uncolored regions (i.e., the number of uncolored regions per unit area) or the size of each uncolored region are greater closer to the inner and outer peripheries of the multicolored pattern 26 than toward the mid-range of the pattern so that the pattern has less colorant near the inner and outer peripheries. The filtering process could be employed in a manner to create a varying density and/or size of uncolored regions from the inner periphery to the outer periphery.

Figure 9:
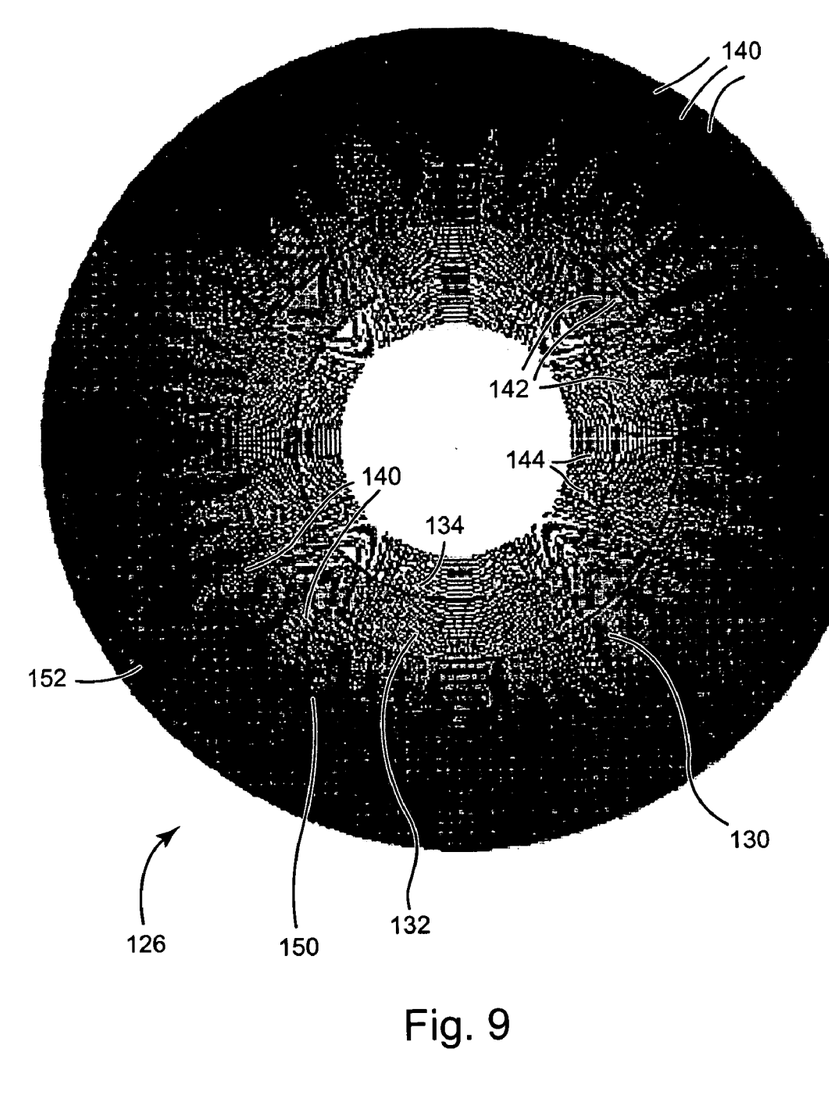
FIG. 9 is a top plan view of another embodiment of a multicolored pattern.

FIG. 9 is a top plan view of another embodiment of a multicolored pattern, generally indicated at 126. The multicolored pattern 126 may be similar to the multicolored pattern 26 of FIG. 1. However, the multicolored pattern 126 preferably has a varying density and/or size of uncolored regions. The multicolored pattern 126 comprises a plurality of color elements. The pattern 126 comprises an annular-shaped outer region 130, an annular-shaped intermediate region 132, and an annular-shaped inner region 134. The outer region 130 generally circumscribes the intermediate region 132, and the intermediate region circumscribes the inner region 134. The outer region 130 has a first plurality of generally uncolored regions 140 defined by some of the colored elements. The outer region might or might not extend to the outer periphery of the multicolored pattern 126. In the present embodiment, the outer region 130 does not extend out to the outer periphery. The intermediate region 132 has a second plurality of generally uncolored regions 142 defined by some of the colored elements. The inner region 134 has a third plurality of generally uncolored regions 144 defined by some of the colored elements. The first plurality of the generally uncolored regions 140 combine to have a first aggregate uncolored area. The second plurality of the generally uncolored regions 142 combine to have a second aggregate uncolored area. The third plurality of the generally uncolored regions 144 combine to have a third aggregate uncolored area. Preferably, the multicolored pattern includes a corona-shaped region 150, having an irregular-shaped corona boundary 152. The multicolored pattern 126 preferably has outer, intermediate, and inner uncolored ratios $R_1$, $R_2$, $R_3$, respectively. The outer uncolored ratio $R_1$ is the first aggregate uncolored area divided by the total area of the outer region 130. The intermediate uncolored ratio $R_2$ is the second aggregate uncolored area divided by the total area of the intermediate region 132. The inner uncolored ratio $R_3$ is the third aggregate uncolored area divided by the total area of the inner region 134. Preferably the ratio $R_1$ is less than the ratio $R_2$, and the ratio $R_2$ is less than the ratio $R_3$. Also preferably, at least 60% of the first aggregate uncolored area is comprised of generally uncolored regions each having an area not greater than approximately 900 square microns, and at least 50% of the third aggregate uncolored area is comprised of generally uncolored regions each having an area greater than approximately 900 square microns.

Figure 10:
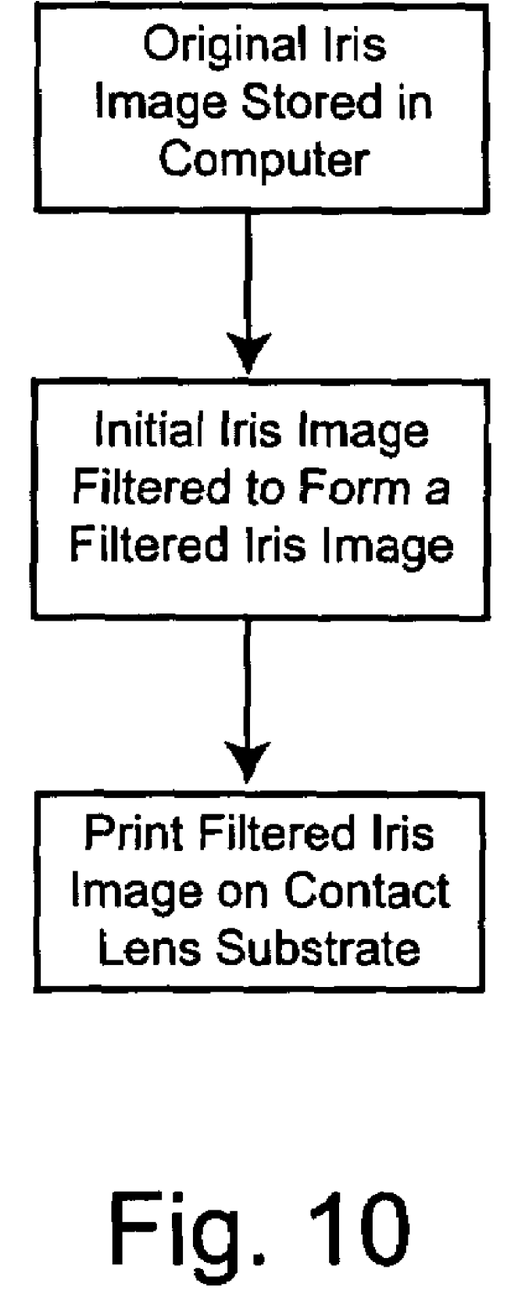
FIG. 10 is a flow diagram of a method of the present invention for transferring an iris image to a contact lens substrate.

The multicolor pattern 126 is preferably formed in a manner as set forth in FIG. 10. First, an original iris image (not shown) is stored in a computer (not shown). The initial iris image is generally annular in shape and is preferably an intricate, multicolor iris image. The initial iris image comprises a plurality of color elements. More preferably, the initial iris image is a digital iris image of an actual human iris (e.g., a digital photograph of an actual human iris). Second, a filtering process is applied to the initial iris image in a manner to replace at least portions of at least some of the color elements with generally uncolored regions to form a filtered iris image, e.g., the multicolored pattern 126. Third, a printer apparatus (such as that described above) is used, in communication with the computer, in a manner to print the filtered iris image on a contact lens substrate.

Preferably, the color elements of the initial iris image comprise a plurality of pixels. The initial iris image preferably has 1440 dots per inch (dpi) or 1440 pixels per inch. Assuming the initial iris image has an outer diameter of 0.39" and an inner diameter (i.e., pupil diameter) of 0.168", the initial iris image comprises approximately 202,000 pixels. A plurality of regions (e.g., an inner region, an intermediate region, and an outer region) are assigned to the initial iris image. Preferably, the inner region has an outer boundary with a radius of 0.15278" (i.e., a diameter of 220 pixels). Preferably, the intermediate region has an outer boundary with a diameter of 0.2084" (i.e., 300 pixels). The inner boundary of the intermediate region is the same as the outer boundary of the inner region. Preferably, the outer region has an outer boundary with a diameter of 0.3472" and an inner boundary the same as the outer boundary of the intermediate region.

Preferably, the filtering process employs appropriate software, such as that described above with reference to filtering, to remove pixels from each of the regions, and more preferably, to remove more pixels per unit area from the inner region than from the intermediate region and to remove more pixels per unit area from the intermediate region than from the outer region. The removed pixels form generally uncolored regions to form the uncolored regions of the filtered image printed on the contact lens substrate.

Preferably, an irregular-shaped corona boundary is assigned to the initial image. Some, but preferably not all, of the inner region of the initial image is surrounded by the corona boundary. For the portion of the inner region of the initial image surrounded by the corona boundary, and starting at the inner periphery of the inner region, one pixel is removed approximately every 0.36 degrees circumferentially around the image for each revolution and with each revolution being stepped approximately 1.5 pixels radially outwardly. Some, but preferably not all, of the intermediate region of the initial image is surrounded by the corona boundary. For the portion of the intermediate region of the initial image surrounded by the corona boundary, and starting at the inner periphery of the intermediate region, one pixel is removed approximately every 0.54 degrees circumferentially around the image for each revolution and with each revolution being stepped approximately 1.5 pixels radially outwardly. Some, but preferably not all, of the outer region of the initial image is surrounded by the corona boundary. For the portion of the outer region of the initial image surrounded by the corona boundary, and starting at the inner periphery of the outer region, one pixel is removed approximately every 0.54 degrees circumferentially around the image for each revolution and with each revolution being stepped approximately 2 pixels radially outwardly. A 25% filter is then applied to the whole iris after all of the previous filtering has occurred to remove one of every four pixels.

The initial iris image has an aggregate color element area comprising the combined area of all of the color elements (e.g., pixels) of the initial iris image. Preferably, at least about 20% of the aggregate color element area is replaced with the generally uncolored regions during the filtering process. More particularly, the initial iris image has an outer aggregate color element area, an intermediate aggregate color element area, and an inner aggregate color element area. The outer aggregate color element area comprises the combined area of all of the color elements (pixels) of the initial iris image within the outer region. The intermediate aggregate color element area comprises the combined area of all of the color elements (pixels) of the initial iris image within the intermediate region. The inner aggregate color element area comprises the combined area of all of the color elements (pixels) of the initial iris image within the inner region. During the filtering process, a percentage $P_o$ of the outer aggregate color element area is replaced with the generally uncolored regions, a percentage $P_m$ of the intermediate color element area is replaced with the generally uncolored regions, and a percentage $P_i$ of the inner aggregate color element area is replaced with the generally uncolored regions. Preferably the percentage $P_o$ is at least 20% and the percentage $P_i$ is at least 150% greater than the percentage $P_o$. Preferably, the percentage $P_m$ is greater than the percentage $P_o$ and less than the percentage $P_i$.

Leaving elements strategically uncolored on an otherwise opaque lens below visual acuity levels enables an increased amount of discreet independent light interactions to occur which enables enough light exchange to take place that the lens replication printed on the lens appears as a duplicate of the original iris image. In other words, there is adequate interaction between the tiny uncolored openings and the iris to produce a realistic replication of a human iris once the lens is placed over the wearer's iris.

In view of the above, it will be seen that the several objects of the invention are achieved and other advantageous results attained.

When introducing elements of the present invention or the preferred embodiment(s) thereof, the articles "a," "an," "the" and "said" are intended to mean that there are one or more of the elements. The terms "comprising," "including" and "having" are intended to be inclusive and mean that there may be additional elements other than the listed elements.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A colored contact lens comprising:
   (a) a generally uncolored pupil region having a center;
   (b) a generally annular-shaped iris region surrounding the pupil region and adapted to cover at least 80% of a wearer's iris when the wearer is wearing the contact lens;
   (c) a multicolored pattern on the iris region, the multicolored pattern being sufficiently colored to change the apparent color of an iris of a person wearing the contact lens, the multicolored pattern comprising:
      (i) a plurality of color elements; and
      (ii) a collarette region, the collarette region being comprised of at least some of the color elements, the collarette region comprising a collarette band at least substantially surrounding the pupil region, the collarette band having a generally jagged outer periphery and a generally jagged inner periphery, the collarette band including at least a first portion spaced less than 4 mm from the center of the pupil region and a second portion spaced at least 6.5 mm from the center of the pupil region.

2. The colored contact lens of claim 1 wherein the color elements are sufficiently colored to mask regions of the wearer's iris that underlie the color elements when the wearer is wearing the contact lens, and the lens further comprises a generally uncolored region defined by one or more of the color elements, the generally uncolored region comprising a generally uncolored segment having a length of at least 30 microns and a width of no greater than 60 microns, wherein both the generally uncolored region and the generally uncolored segment are sufficiently devoid of colorant so as not to mask regions of the wearer's iris that underlie the generally uncolored region and the generally uncolored segment when the wearer is wearing the contact lens.

3. The colored contact lens of claim 1 wherein the multicolored pattern further comprises a plurality of crypts of Fuchs elements each having the appearance of a crypts of Fuchs, each of the crypts of Fuchs elements being comprised of at least some of the color elements, and contrasting in color with the color elements adjacent the crypts of Fuchs elements and having a generally oblong shape.

4. The colored contact lens of claim 1 wherein the multicolored pattern further comprises a pupillary margin region including a generally annular-shaped band and a plurality of fingers, the pupillary margin region being comprised of at least some of the color elements, the generally annular-shaped band surrounding the pupil region with at least 90% of the band being within a radius of 4 mm from the center, the plurality of fingers extending generally radially outwardly from the generally annular-shaped band and away from the center with at least 90% of the plurality of fingers in aggregate being within a radius of 5 mm from the center.

5. The colored contact lens of claim 1 that is hydrophilic and hydrated.

6. A colored contact lens comprising:
   (a) a generally uncolored pupil region, the pupil region having a center;

(b) a generally annular-shaped iris region surrounding the pupil region and adapted to cover at least 80% of a wearer's iris when the wearer is wearing the contact lens;

(c) a multicolored pattern on the iris region, the multicolored pattern being sufficiently colored to change the apparent color of an iris of a person wearing the contact lens, the multicolored pattern comprising:

(i) a plurality of color elements, which are sufficiently colored to mask regions of the wearer's iris that underlie the color elements when the wearer is wearing the contact lens;

(ii) a collarette region, the collarette region being comprised of at least some of the color elements, the collarette region comprising a collarette band at least substantially surrounding the pupil region, the collarette band having a generally jagged outer periphery and a generally jagged inner periphery, the collarette band including at least a first portion spaced less than 4 mm from the center of the pupil region and a second portion spaced at least 6.5 mm from the center of the pupil region; and (iii) a plurality of crypts of Fuchs elements each having the appearance of a crypts of Fuchs, each of the crypts of Fuchs elements being comprised of at least some of the color elements, each of the plurality of crypts of Fuchs elements contrasting in color with the color elements adjacent the crypts of Fuchs elements and having a generally oblong shape; and (d) a generally uncolored region defined by one or more of the color elements, the generally uncolored region comprising a generally uncolored segment, the generally uncolored segment having a length of at least 30 microns and a width of no greater than 60 microns, wherein both the generally uncolored region and the generally uncolored segment are sufficiently devoid of colorant so as not to mask regions of the wearer's iris that underlie the generally uncolored region and the generally uncolored segment when the wearer is wearing the contact lens.

7. The colored contact lens of claim 6 wherein the multicolored pattern further comprises:

(i) a papillary margin region including a generally annular-shaped band and a plurality of fingers, the papillary margin region being comprised of at least some of the color elements, the generally annular-shaped band surrounding the pupil region with at least 90% of the band being within a radius of 4 mm from the center, the plurality of fingers extending generally radially outwardly from the generally annular-shaped band and away from the center with at lest 90% of the plurality of fingers in aggregate being within a radius of 5 mm from the center.

8. The colored contact lens of claim 7 that is hydrophilic and hydrated.

9. The colored contact lens of claim 7 wherein each of the crypts of Fuchs elements extends generally radially away from the pupil region.

10. The colored contact lens of claim 7 wherein the generally annular-shaped band and the fingers are of a predominately first color and a predominately second color, respectively, and the predominately first color is darker than the predominately second color.

11. The colored contact lens of claim 7 wherein the generally annular-shaped band is of at lest one generally dark, light-absorbing color.

12. The colored contact lens of claim 7 wherein the generally uncolored segment has a length of at least 100 microns and a width of no greater than 40 microns.

13. The colored contact lens of claim 7 wherein the generally uncolored region is completely encircled by a single color element.

14. The colored contact lens of claim 7 wherein the lens comprises a plurality of generally uncolored regions.

15. The colored contact lens of claim 14 wherein the lens comprises at least 1000 generally uncolored regions.

16. The colored contact lens of claim 15 wherein the at least 1000 generally uncolored regions comprise at least 1000 generally uncolored segments.

17. A colored contact lens comprising:

(a) a generally uncolored pupil region, the pupil region having a center;

(b) a generally annular-shaped iris region surrounding the pupil region and adapted to cover at least 80% of a wearer's iris when the wearer is wearing the contact lens;

(c) a multicolored pattern on the iris region, the multicolored pattern being sufficiently colored to change the apparent color of an iris of a person wearing the contact lens, the multicolored pattern comprising:

(i) a plurality of color elements; and (ii) a collarette region, the collarette region being comprised of at least some of the color elements, the collarette region comprising a collarette band at least substantially surrounding the pupil region, the collarette band having a generally jagged outer periphery and a generally jagged inner periphery, the collarette band including at least a first portion spaced less than 4 mm from the center of the pupil region and a second portion spaced at least 6.5 mm from the center of the pupil region; and (d) more than 1000 discrete generally uncolored regions defined by the color elements, wherein at least 1000 of the discrete generally uncolored regions are sufficiently small such that their presence cannot be detected when an ordinary viewer with 20/20 vision is viewing the contact lens from a distance of sixteen inches while a wearer is wearing the contact lens.

18. The colored contact lens of claim 17 wherein the lens comprises more than 10,000 discrete generally uncolored regions of which at least 5000 are sufficiently small such that their presence cannot be detected when the ordinary viewer with 20/20 vision is viewing the contact lens from a distance of sixteen inches while the wearer is wearing the contact lens.

19. The colored contact lens of claim 17 wherein the color elements are sufficiently colored to mask regions of the wearer's iris that underlie the color elements when the wearer is wearing the contact lens.

20. The colored contact lens of claim 17 wherein the multicolored pattern further comprises a plurality of crypts of Fuchs elements each having the appearance of a crypts of Fuchs, each of the crypts of Fuchs elements being comprised of at least some of the color elements, each of the plurality of crypts of Fuchs elements contrasting in color with the color elements adjacent the crypts of Fuchs elements and having a generally oblong shape.

21. The colored contact lens of claim 17 wherein the multicolored pattern further comprises a papillary margin region including a generally annular-shaped band and a plurality of fingers, the papillary margin region being comprised of at least some of the color elements, the band surrounding the pupil region, at least 90% of the band being within a radius of 4 mm from the center, the plurality of fingers extending generally radially outwardly from the band and away from the center, at least 90% of the plurality of fingers in aggregate being within a radius of 5 mm from the center.

* * * * *

UNITED STATES PATENT AND TRADEMARK OFFICE
CERTIFICATE OF CORRECTION

| | |
|---|---|
| PATENT NO. | : 7,172,286 B2 |
| APPLICATION NO. | : 11/133976 |
| DATED | : February 6, 2007 |
| INVENTOR(S) | : Daniel G. Streibig |

It is certified that error appears in the above-identified patent and that said Letters Patent is hereby corrected as shown below:

<u>Title Page</u>,
Insert missing section:
-- Item (74), *Attorney, Agent or Firm*–Woodcock Washburn LLP --.

<u>Column 1</u>,
Line 59, delete "5,963,705," and insert -- 5,936,705, --.

<u>Column 14</u>,
Line 2, delete "lest" and insert -- least --.

Signed and Sealed this

Seventeenth Day of June, 2008

JON W. DUDAS
*Director of the United States Patent and Trademark Office*